US007814413B2

(12) United States Patent
Venkataraman et al.

(10) Patent No.: US 7,814,413 B2
(45) Date of Patent: Oct. 12, 2010

(54) SYSTEM AND METHOD FOR CONTROLLING WEB PAGES

(75) Inventors: Manikandan Venkataraman, Fremont, CA (US); Jose Mateo Miranda, San Francisco, CA (US); Sundeep Anand Nayak, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1918 days.

(21) Appl. No.: 10/417,835

(22) Filed: Apr. 17, 2003

(65) Prior Publication Data
US 2004/0215613 A1 Oct. 28, 2004

(51) Int. Cl.
*G06F 15/00* (2006.01)
*G06F 17/30* (2006.01)

(52) U.S. Cl. .................. 715/243; 715/234; 715/255; 715/273; 707/999.004; 707/E17.116

(58) Field of Classification Search ............... 715/200, 715/204, 205, 234, 243, 246, 251, 255, 273, 715/274, 760, 788; 707/1, 3, 4, 6, 7, 10, 707/100, 101, 102, 104.1, 200, 790, 796, 707/912, 918, 964, 999.001, 999.002, 999.003, 707/999.004, E17.116, E17.117, E17.12, 707/E17.129, E17.135
See application file for complete search history.

(56) References Cited

U.S. PATENT DOCUMENTS

| | | | | |
|---|---|---|---|---|
| 5,870,559 A * | 2/1999 | Leshem et al. | ............... | 709/224 |
| 6,035,330 A * | 3/2000 | Astiz et al. | .................. | 709/218 |
| 6,069,630 A * | 5/2000 | Lisle et al. | .................. | 715/804 |
| 6,549,944 B1 * | 4/2003 | Weinberg et al. | ........... | 709/224 |
| 6,591,266 B1 * | 7/2003 | Li et al. | ......................... | 707/10 |
| 6,697,825 B1 * | 2/2004 | Underwood et al. | ........ | 715/207 |
| 6,738,804 B1 * | 5/2004 | Lo | ............................. | 709/219 |
| 6,785,864 B1 * | 8/2004 | Te et al. | ...................... | 715/205 |
| 6,832,263 B2 * | 12/2004 | Polizzi et al. | ............... | 709/246 |
| 6,957,383 B1 * | 10/2005 | Smith | ......................... | 715/207 |

(Continued)

FOREIGN PATENT DOCUMENTS

WO  WO 00/70511 A1 * 11/2000

OTHER PUBLICATIONS

Mendelzon et al., "Query the World Wide Web", International Journal on Digital Libraries, vol. 1, No. 1, pp. 54-67, 1997.*

(Continued)

*Primary Examiner*—Laurie Ries
*Assistant Examiner*—Maikhanh Nguyen
(74) *Attorney, Agent, or Firm*—Kraguljac & Kalnay, LLC

(57) ABSTRACT

In one embodiment, a system for controlling content on a web page is provided. In the embodiment, the system includes a display map configured to identify selected content to be displayed to a selected position within one or more web pages. Moreover, the system includes a web page control logic configured to display content to one or more web pages based on the display mapping where the displayed content can be reorganized by modifying the display mapping without modifying the web page control logic.

7 Claims, 4 Drawing Sheets

U.S. PATENT DOCUMENTS

| | | | | |
|---|---|---|---|---|
| 6,993,575 | B2 * | 1/2006 | Abkowitz et al. | 709/220 |
| 7,062,511 | B1 * | 6/2006 | Poulsen | 707/104.1 |
| 7,222,296 | B2 * | 5/2007 | Breymeier et al. | 715/221 |
| 7,296,222 | B1 * | 11/2007 | Sakairi | 715/234 |
| 7,487,185 | B2 * | 2/2009 | Lomelin-Stoupignan et al. | 707/201 |
| 2003/0051022 | A1 * | 3/2003 | Sogabe et al. | 709/223 |
| 2006/0271844 | A1 * | 11/2006 | Suklikar et al. | 715/513 |

OTHER PUBLICATIONS

Douglis et al., "WebGuide: Querying and Navigating changes in Web repositories", Fifth International World Wide Web Conference, France, May 1996, pp. 1-13.*

Ricca et al., "Understanding and Restructuring Web Sites with ReWeb", IEEE, Apr. 2001, pp. 40-51.*

"NetCarta WebMap", The Open Web Management Solution, 1996, 19 pages.*

"NetCarta WebMapper 1.0 User's Guide", 1996, 135 pages.*

* cited by examiner

405 \ Display Table    Content Table /400

| Page | Q_ID |
|---|---|
| 1 | 1 |
| 1 | 10 |
| 1 | 11 |
| 2 | 6 |
| 2 | 7 |
| ⋮ | ⋮ |

| Q_ID | Language | Label |
|---|---|---|
| 1 | English | Name |
| 1 | Spanish | El Nombre |
| ⋮ | | |
| 10 | English | Address 1 |
| 11 | English | Address 2 |
| ⋮ | | |

Figure 4

Storage Mapping

| Q_ID | Table Name | Column Name |
|---|---|---|
| 1 | Customer_Data | Cust_Name |
| 10 | Customer_Data | Cust_Address |
| ⋮ | ⋮ | |
| 15 | Order_Data | Order_Number |
| ⋮ | ⋮ | |

Figure 5

SYSTEM AND METHOD FOR CONTROLLING WEB PAGES

BACKGROUND

For typical web-based data entry pages, customized software routines are programmed for each particular web page in order to retrieve content from a database and display it on the web page. Similarly, a different customized software routine is used for posting data into the database that is received from the web page. Thus, for typical applications, each web page may need two routines to handle the display and storage of content. For numerous data entry pages, this may require much programming. Furthermore, after building the web pages, changes to the pages such as addition, deletion, or movement of data entry fields or content, would need the software routines to be reprogrammed to accommodate the changes. Changes to software may also require recompiling and re-testing which could add additional time to the process.

BRIEF DESCRIPTION OF THE DRAWINGS

In the accompanying drawings which are incorporated in and constitute a part of the specification, embodiments of a system and method are illustrated which, together with the detailed description given below, serve to describe the example the embodiments of the system and method. It will be appreciated that the illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vise versa.

FIG. 4 shows one embodiment of a content database and a display table.

FIG. 5 shows one embodiment of a storage mapping table.

DETAILED DESCRIPTION OF ILLUSTRATED EMBODIMENTS

Figure 1:
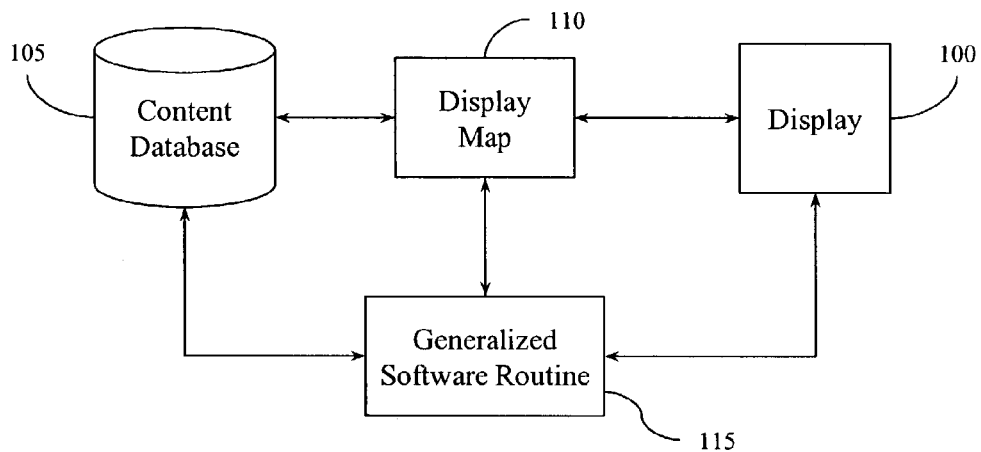
FIG. 1 illustrates one embodiment of a system for generating a display with selected content.

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Data Structure", as used herein, refers to any structure(s) that can be configured to store data. A data structure may be embodied as one or more databases, tables, text files, linked lists, arrays, trees, or other desired data structure configured to store information. The data structure may include one or more indices, hash functions, relational components, or other mechanisms that assist in accessing the data structure if desired. The data structure, in one embodiment, may be embodied in a computer-readable medium.

"Computer-readable medium", as used herein, refers to any medium that participates in directly or indirectly providing signals, instructions and/or data to one or more processors for execution. Such a medium may take many forms, including but not limited to, non-volatile media, and volatile media. Non-volatile media may include, for example, optical or magnetic disks. Volatile media may include dynamic memory. Common forms of computer-readable media include, for example, a floppy disk, a flexible disk, hard disk, magnetic tape, or any other magnetic medium, a CD-ROM, any other optical medium, any other physical medium with patterns of holes, a RAM, a PROM, an EPROM, a FLASH-EPROM, any other memory chip or cartridge, or any other medium from which a computer, a processor or other electronic device can read.

"Logic", as used herein, includes but is not limited to hardware, firmware, stored software and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmable/programmed logic device, memory device containing instructions, or the like. Logic may also be fully embodied as software stored on a computer-readable medium.

"Signal", as used herein, includes but is not limited to one or more electrical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as objects, routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software may be dependent on, for example, requirements of a desired application, the environment it runs on, and/or the desires of a designer/programmer or the like.

"User", as used herein, includes but is not limited to one or more persons, software, computers or other devices, or combinations of these.

Generally, in one embodiment, a system is provided that helps build web pages that have functions of data retrieval, storage, or both to and from a database. The system also provides a way of changing or reorganizing the content of web pages after the pages have been built. In one embodiment, a database table can be configured to maintain various attributes of content to be displayed on the web pages. A generalized software routine can then be configured to read the attributes from the database table and generate the web pages in accordance with the attributes. In this manner, changing the configuration of the web pages can be achieved by changing the attributes in the database table rather than reconfiguring or reprogramming the software routine. In one embodiment, the system is a generic data retrieval and updating tool for web based database applications.

Illustrated in FIG. 1 is one embodiment of a system for controlling or otherwise generating content onto a display 100. The system may include one or more content databases 105 that serve as a repository of content that may be used when generating the content on the display 100. A display map 110 is configured to identify selected content from the content database 105 that is to be displayed on the display 100. In one embodiment, the display 100 can be part of a client-side computer that displays Internet web pages and where the other components (105, 110, 115) are on a server-side.

In one embodiment, the display table 110 can be configured as a database table or other type of data structure as desired. The display map 110 can be defined with various attributes or display properties that serve as instructions on how to build or otherwise generate content to be displayed. In that regard, a generalized software routine 115 may be configured to generate web pages for the display 100 in accordance with the display map 110. Since the display map 110 contains information about how the web pages are to appear, the software routine 115 can be programmed to dynamically generate and build the web pages rather than being hard coded to generate web pages with a specific organization and format of content.

In one embodiment, the content database 105 may contain a content identifier for each piece of content stored in the database 105. For example, if the content included a group of questions, each question may be assigned a unique identifier. The display map 110 can then define a display list which includes the identifiers of the content to be displayed. Furthermore, each identifier can be assigned location information that designates where the corresponding content is to be displayed. For example, the location information may include a page number or other types of positional information. In other words, the display map 110 is configured to map selected content from the content database 105 to the display 100.

In order to generate the content on the display 100, the generalized software routine 115 reads the information from the display map 110 to determine which content is to be used and its positional data. The content identifiers are read from the display map 110 and the content associated with those identifiers are then retrieved from the content database 105. A web page can then be generated with the retrieved content and with its positional information. With this configuration, web pages or other types of display can be built, updated, reconfigured, or otherwise rearranged simply by modifying the data in the display map 110. As such, re-programming and re-compiling the generalized software routine 115 can be reduced or eliminated.

Figure 2:
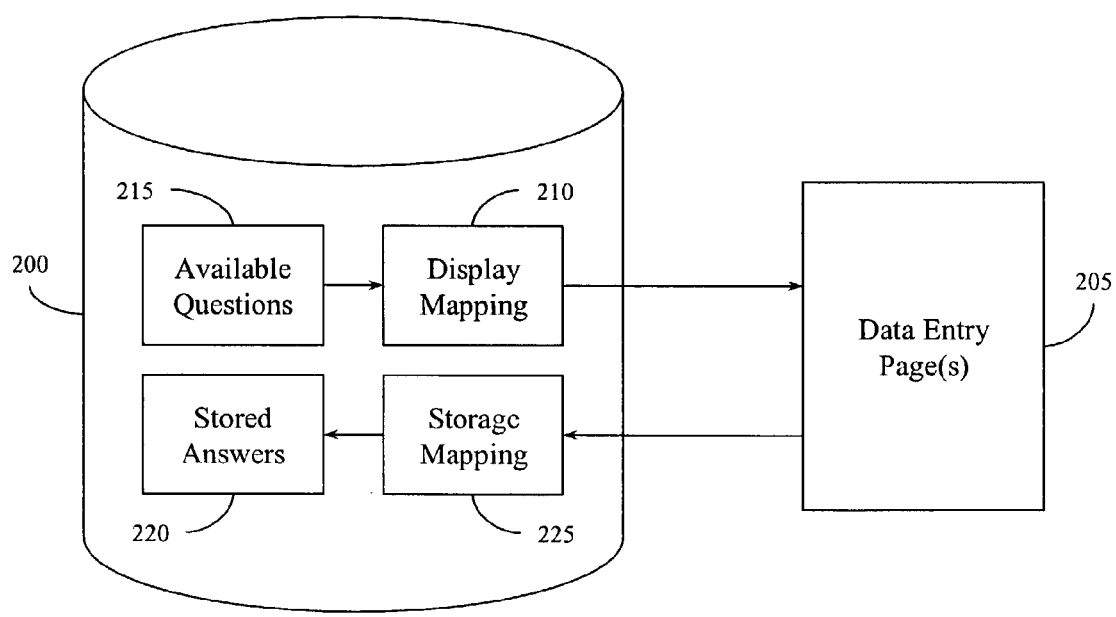
FIG. 2 illustrates another embodiment of a system for controlling display and storage of data to and from data entry pages.
Figure 3:
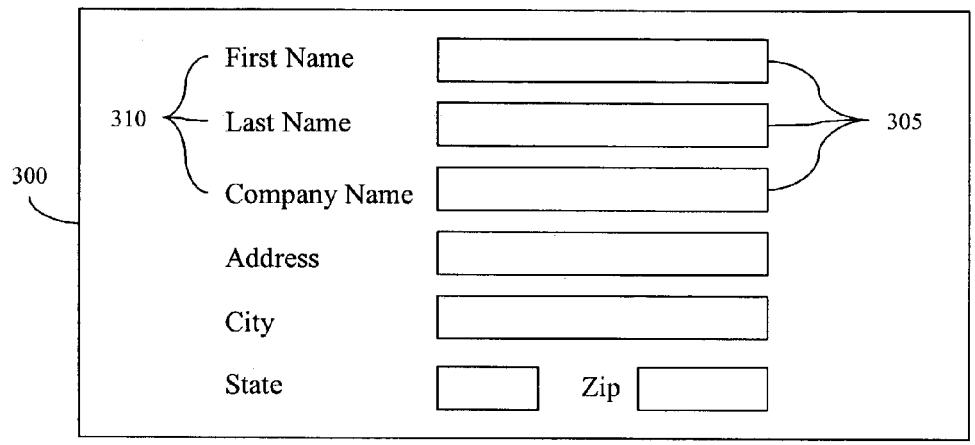
FIG. 3 illustrates one embodiment of data entry fields configured on a display.

Illustrated in FIG. 2 is another embodiment of a mapping system 200 used to organize and control content to a display. In this embodiment, the display includes one or more data entry pages 205 that are configured to provide information to and retrieve information from a user. The data entry pages 205 may be embodied as web-based pages that are displayed through a browser. Examples of data entry pages 205 may include pages that collect personal information from a user, customer information, billing information, or any other type of desired data. The collected data may then be stored in a database. The data entry pages 205 may include one or more data entry fields that are configured to accept input from a user. Each data entry field may have an associated label or question that identifies what type of information is to be inputted into a particular data entry field. One example of a data entry page is shown in FIG. 3 as page 300 that has a set of data entry fields 305 and their corresponding labels 310. In this example, the content would include both the data entry fields 305 and the labels 310. Of course, in other embodiments, any type of content may be used which may include other desired forms.

With reference again to FIG. 2, the mapping system 200 can be maintained in one or more computer-readable mediums and may be embodied as one or more databases or other data structures as desired. It will be appreciated that each component of the mapping system 200 can be maintained in a separate data structure or shared with other components in a data structure. In the following example, the system will be described with reference to a system that controls data entry fields which is also referred to as content. To control the display of data entry fields to the data entry pages 205, a display mapping 210 is provided.

In one embodiment, the display mapping 210 can be configured as a database. The display mapping 210 can be defined to identify one or more selected questions from a group of available questions 215 and map, or otherwise associate, each selected question to the data entry pages 205. It will be appreciated that the term "question" in this context represents a label having one or more alpha-numeric characters and an associated data entry field. By modifying the data in the display mapping 210, the organization of the data entry pages 205 can be changed. For example, questions may be added or removed from the display mapping 210, the questions may be positioned in different locations on the data entry pages 205 or other type of modification.

As data is inputted into the data entry fields of the data entry pages 205, the answers are stored in an answer database 220 or other data structure. To control the storage of the received answers, a storage mapping 225 is defined. The storage mapping 225 is configured to identify a storage location for each answer associated with each question. In one embodiment, the storage mapping 225 identifies a database name and column where an answer is to be stored. In order to change the location of an answer, the data in the storage mapping 225 associated with that answer can be changed. Since these types of modifications involve simply changing of data, executable software would not need to be reprogrammed to affect the change. Subsequently, stored answers 220 can be programmatically retrieved by reading the storage mapping 225 to determine where the answers are stored. The answers may then be re-displayed to the data entry pages 205 to allow a user to view previously stored information and change the information.

As stated previously, the display mapping 210 and storage mapping 225 are embodied as, for example, one or more database tables. Executable software or other logic can be programmed or configured to read from the display mapping 210 and generate the data entry pages 205 in accordance with the display mapping 210. Likewise, the executable software can retrieve answers from the data entry pages 205 and store the answers in accordance with the storage mapping 225. Changes to the data entry pages 205 such as reordering questions, adding or removing questions, repositioning questions and, controlling where and how their corresponding answers are stored can be performed by changing the data in the display mapping 210 and storage mapping 225 without having to reprogram executable software.

Illustrated in FIG. 4 is one embodiment of a content database 400 and a display table 405. The content database 400 can be a repository of content that may be used to build a display such as a web page. The display table 405 can be configured as a database that identifies selected content from the content database 400 to be used when building one or more web pages. In the following example, the web pages will be described as having data entry fields that can provide information to and receive information from a user. A data entry field can include an input field for such information and a label or question associated with the field that identifies the type of information that appears in that input field. As previously shown in FIG. 3, one example of a data entry page 300 is shown having a plurality of labels 310 displayed adjacent to their corresponding input fields 305.

In one embodiment, the content database 400 can be configured to have each record (row) associated with a piece of content. Each record may include, for example, any number of fields or attributes such as a question identifier Q_ID 410, a language attribute 415, a label 420, and/or other desired attributes. The question identifier 410 can be used to identify a question where the text of the question appears in the label 420 column. For example, label "Name" has a Q_ID of "1" and label "Address 1" has a Q_ID of "10". In general, the content database 400 may include one or more attributes associated with each record of content that can affect the display of the content. For example, the attribute "Language" 415 can be defined to indicate the language that the Label 420 appears in. Thus, a particular Label 420 can be repeated in one or more languages within the content database 400 but with a different language attribute 415. For example as shown in FIG. 4, there are two records that have a Q_ID of "1" that have an equivalent Label 420 but one is in English and the other in Spanish. Thus, the Q_IDs may or may not be unique for each record of content, but when combined with one or more other attributes, each record can be uniquely identified. Using the language attribute 415 in building web pages or other displays will be described in greater detail below.

With further reference to FIG. 4, the content database 400 maintains the content that may be selected when building a display. Since the content is maintained in a database, it can be easily modified using any desired database software. New questions can be added to the database 400, deleted, modified, and/or reorganized if desired.

The display table 405 can be configured to define selected questions from the content database 400 that will be used to generate a web page. In one embodiment, the display table 405 defines a display list of questions by identifying the Q_ID of the questions to be used and an associated location information indicating where the corresponding question is to be displayed. For example, each Q_ID 410 can be defined with a selected page as represented by a page column 425. For example, questions 1, 10 and 11 have been defined to appear on web page number 1. Of course, other attributes can be used in the display table 405 such as more detailed location information for each question, the language the questions are to appear in, or other desired display attribute.

Using the display table 405, a designer can configure web pages by identifying selected questions to be displayed and where to display the questions. In this manner, the display table 405 serves as a mapping function that maps selected content from the content database 400 to a display. Once the display table 405 is configured, executable software or other logic can be configured to read the display table 405 and build one or more web pages in accordance therewith. For example, the software can be configured to determine all records that are associated with page number "1", determine the Q_ID for those records, and retrieve the content associated with those Q_IDs from the content database 400. Web page number "1" can then be generated with those questions. The software would then repeat for each different web page number found in the display table 405.

To change the order of the questions on a web page, remove questions, add questions or make other modifications as desired, the display table 405 would simply be changed with the desired modification without having to reprogram or reconfigure the executable software that generates the web pages. It will be appreciated that avoiding reprogramming of software can avoid recompiling and re-testing of the software. This in turn can reduce the turnaround time for modifying web pages or other types of displays. It will be appreciated that in certain programming languages, such as JAVA, the above-described system can be used as a tool to a web page designer who can combine the system with other software tools in order to build desired web pages in accordance with desired formatting.

In another embodiment of this system, additional attributes may be used in the content database 400 and associated display table 405 as seen in FIG. 4. In particular, with the language attributes 415, a web page can be easily changed between various languages without having to reprogram the executable software or to maintain separate software for each language of a web page. Once the organization of a web page is defined by the display table 405, a flag or other identifier can be set to indicate what type of language the web page should be displayed in. Based on the language, the software would retrieve the question identifiers Q_ID 410 from the content database 400 that matches the selected language. Thus, when a user desires a web page to be presented in a selected language, the web page generation software simply would read the question identifiers associated with that language and display the associated content (e.g. label 420). Therefore, separate software to handle different languages can be minimized or avoided.

Illustrated in FIG. 5 is one embodiment of a storage mapping table 500 configured to map answers received from displayed questions to a storage location. Thus, when data is inputted into a data entry field for a question, the storage of that data can be controlled with the storage mapping table 500. By defining the storage mapping table 500 to map where to store data received from web pages, which also indicates how to retrieve that data for subsequent use, generic software can be programmed to control storage and retrieval of data without having to reprogram the software when changes to the data or storage locations are made.

In one embodiment of the storage mapping table 500, each record includes the Q_ID 410 that matches a Q_ID from the display table 405 of a displayed question from the display table 405. For each question, storage location information is defined that tells where the answer for the corresponding question is to be stored. For example, if the answers are to be stored in a database that are identified by a table name and furthermore by a particular column name within that table, the storage mapping may include table name 505 and a column name 510.

For example, suppose Q_ID "1" corresponds to a question that asks for a customer's name. The customer's answer to that question can be stored in a data table with the name "Customer_Data" and within that table, in a column having a name "Cust_Name".

The storage mapping table 500 can also be used for retrieving stored data so that it can be re-displayed. For example, suppose a user wishes to have access to a web site. Before access is granted, the web site displays a number of questions to the user requesting personal information. Those questions can be displayed in one or more web pages using the display table 405. As answers are inputted for each question, those answers can be stored in accordance with the storage mapping table 500. At a subsequent time, the user may reenter the web site to review his/her personal information. Software can be programmed to read the storage mapping table 500 in order to retrieve the previously stored answers and display the answers with the questions in accordance with the display table 405.

In one embodiment, the software can be configured to generate queries based on the location information, such as table name and column name, to retrieve the data. Thus, the software does not have to be programmed with specific location information to retrieve such data. As a result, changing the storage location of data can be performed by changing the storage mapping information rather than reprogramming the software. It will be appreciated that the type of storage location information can depend on the type of data structure used to store the information. As such, different types of location identifiers can be used to associate each question and corresponding answer to a storage location.

Figure 6:
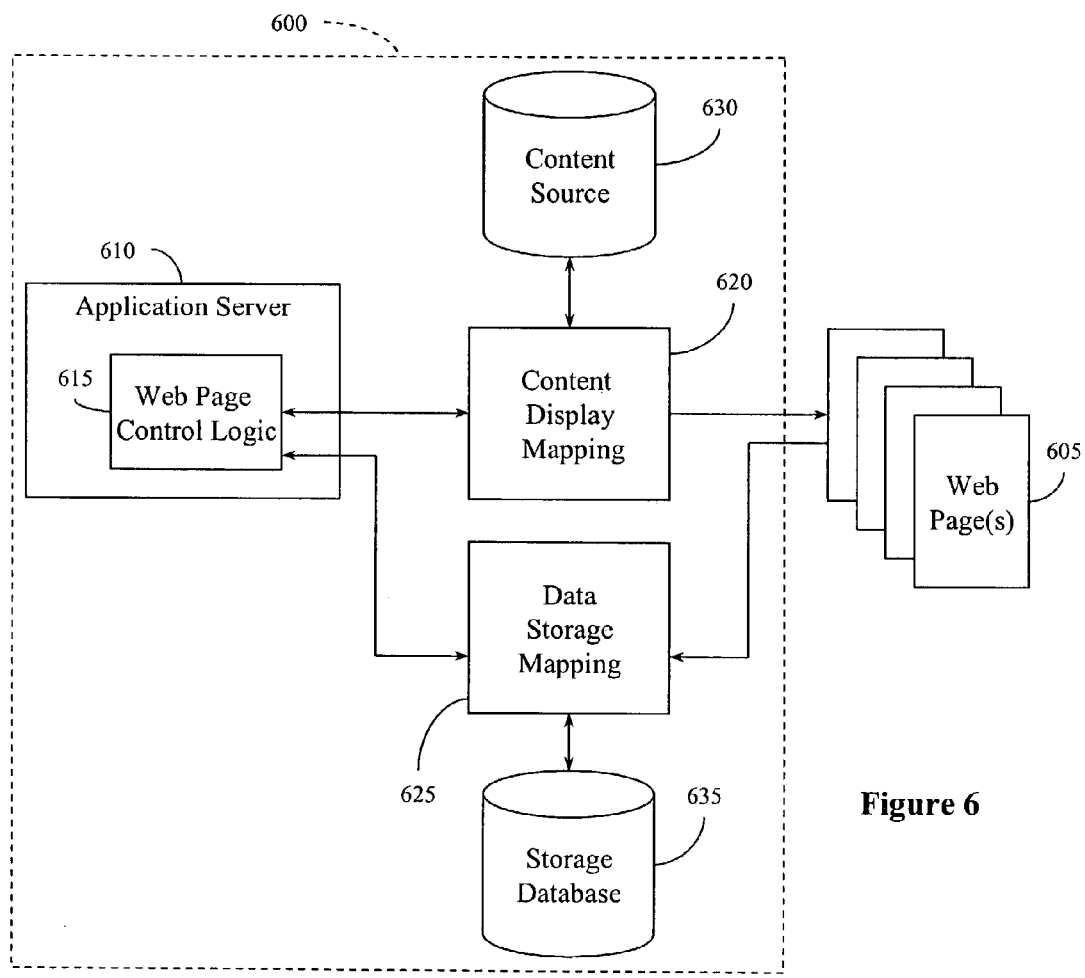
FIG. 6 illustrates another embodiment of a system for controlling web pages.

Illustrated in FIG. 6 is another embodiment of a system 600 for controlling the display of content to one or more web pages 605 and storing data received from the web pages 605. In one embodiment, the system 600 may be configured on a server side of a network and where the web pages 605 are ultimately displayed to a user on a client side of a network via, for example, browser software. For example, one or more application servers 610 may be configured to control the web pages 605. A web page control logic 615 can be configured to operate with a particular group of web pages 605 which may include generating the web pages 605 with selected content based on a content display mapping 620 and, storing retrieved data based on a data storage mapping 625.

The content display mapping 620 and the data storage mapping 625 can be regarded as mapping functions. Using the mapping functions, the web page control logic 615 can be programmed without specific display and storage information that would require reprogramming in order to make modifications to either the display format or the storage of data. The content display mapping 620 can be configured to define a display list of content selected from a content source 630. In one embodiment, the content may include one or more questions and an associated data entry field for receiving an answer for each question. Each question can be assigned an identifier such that the content display mapping 620 can be defined with a list of identifiers representing the questions to be displayed on the web pages 605. Additionally, for each identifier, a location identifier may be included that indicates where the associated question is to be displayed.

When generating the web pages 605, the web page control logic 615 can be configured to read the identifiers from the content display mapping 620, retrieve the content associated with those identifiers from the content source 630, and display the content to the appropriate web page 605 based on the location information corresponding to each question. As answers are inputted for each displayed question on the web pages 605, the web page control logic 615 receives the answers and stores them to a storage database 635 based on the data storage mapping 625. Similarly, when retrieving previously stored data and displaying it on the web pages 605, the web page control logic 615 can read the data storage mapping 625 to determine the storage location for each answer. Using the storage location, one or more queries can be generated that retrieve the data from the storage database 635. In this manner, queries can be programmatically generated to be specific queries based on the data storage mapping 625. In one embodiment, the web page control logic 615 may include a query generator logic configured to generate the queries to retrieve data.

As previously described, changing the configuration of content displayed on the web pages 605 and/or changing the storage locations of associated inputted data can be performed by changing the data within the content display mapping 620 and the data storage mapping 625. Thus, the web page control logic 615 would not need to be reprogrammed in order to affect a format change or storage change for the web pages 605.

Figure 7:
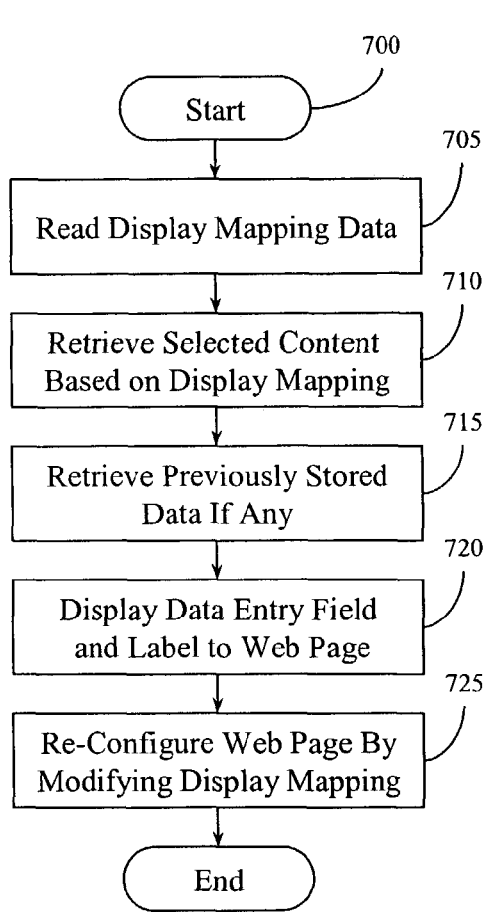
FIG. 7 illustrates one embodiment of a methodology for displaying content.

Illustrated in FIG. 7 is one embodiment of a methodology 700 for displaying content to a display such as a web page. The illustrated elements denote "processing blocks" and represent computer software instructions or groups of instructions that cause a computer or processor to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, do not depict syntax of any particular programming language. Rather, the diagrams illustrate functional information one skilled in the art could use to fabricate circuits, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. They may also be implemented using various programming approaches such as machine language, procedural, object oriented and/or artificial intelligence techniques. The foregoing applies to all methodologies described herein.

Figure 8:
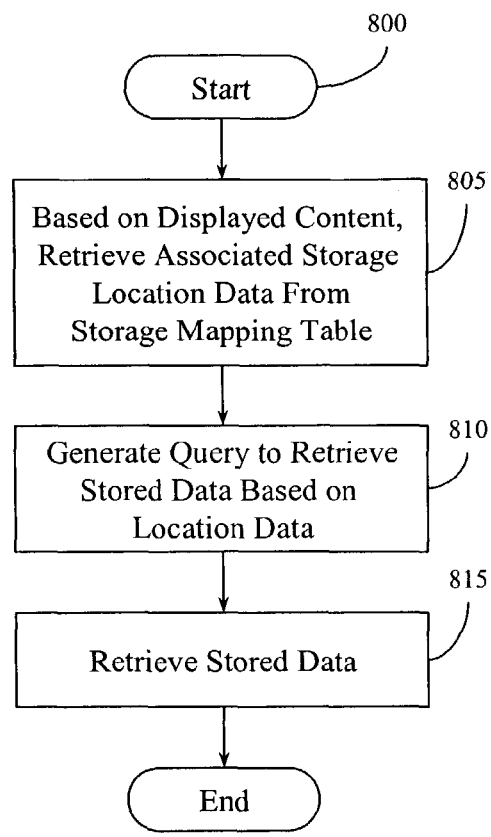
FIG. 8 shows one embodiment of a methodology for retrieving previously stored data.

With reference to FIG. 7, the methodology assumes that a display mapping function or data table is maintained that identifies selected content to be displayed similar to the embodiments of the content display mapping described above. When generating a web page, the display mapping data is read (Block 705). Based on the display mapping data, selected content is retrieved from, for example, a content database (Block 710). In an embodiment where the content represents questions and associated data entry fields, the process can determine if previously stored data exists for an associated question and to retrieve the stored data if it exists (Block 715). One embodiment of the retrieving process is shown in FIG. 8. Once the content is retrieved, the content is displayed to its designated location on a web page (Block 720). If the content includes a data entry field and corresponding label, data entry pages can be generated in order to capture data from users. If a change is desired to reorganize or modify the content being displayed, the web page can be re-configured by modifying the display mapping (Block 725).

Illustrated in FIG. 8 is one embodiment of a methodology for retrieving previously stored data based on a storage mapping function. This embodiment may be used in conjunction with web pages or other displays that can receive input from a user such as through data entry fields. Based on the displayed content on a web page, associated storage location data is retrieved from a storage mapping table (Block 805). An association between the displayed content and storage location data can be achieved by having an identifier assigned to each displayed question, or otherwise each displayed piece of content. Knowing the storage location, one or more queries can be generated to retrieve the stored data (Block 810). The stored data is then retrieved using the one or more queries (Block 815). Once retrieved, the data can then be displayed in the appropriate data entry field on the web page by the display process.

Figure 9:
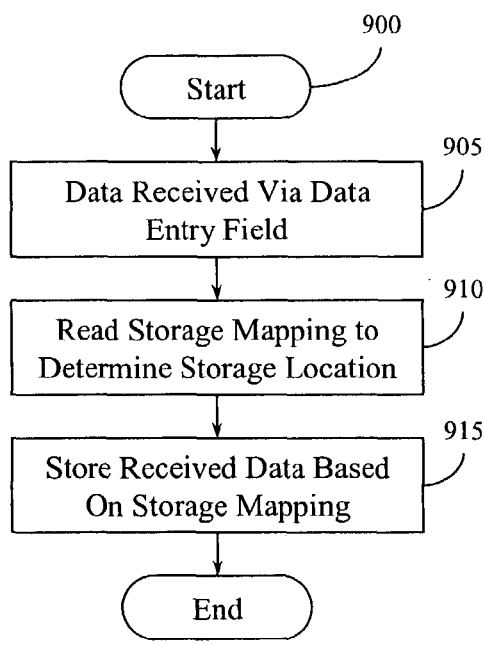
FIG. 9 shows one embodiment of a methodology for capturing and storing data.

Illustrated in FIG. 9 is one embodiment of a methodology 900 for capturing data inputted into a data entry field associated with a displayed content. The methodology 900 is described from a perspective that a web page has been generated and is displayed with one or more data entry fields and associated questions or labels. At that point, a user may enter data into the data entry fields. Once data is inputted, the data can then be stored using, for example, the following process.

Data is first received via a data entry field (Block 905). It is known that the data entry field has an associated identifier which can be determined from the display mapping table used in FIG. 7. The storage mapping table is then read to determine the storage location associated with that identifier and thus its question (Block 910). The received data is then stored based on the storage location of the storage mapping table (Block 915). As mentioned previously, with the storage mapping table, data can be similarly retrieved by knowing the identifier assigned to the question or other content.

With the various embodiments described above, a tool can be designed to assist with organizing and formatting content on a display such as web pages. By using a display mapping function, for example, defined in a data table, that defines the content to be displayed and its position on a web page, making changes to the web pages can be easily performed without having to reprogram software. It will be appreciated to those of ordinary skill in the art that other types of content can be used with the present systems and methods. For example, each piece of content may represent an article such that by selecting articles and locations, a web page can be designed that simulates a magazine or newspaper. Making changes to the order, arrangement, and/or configuration of articles can be easily performed by modifying the display mapping table. Furthermore, with this type of content, data entry fields may not be present. Thus, in some embodiments, a storage mapping table may not be necessary.

Suitable software for implementing the various components of the present system and method using the teachings presented here include programming languages and tools such as Java, Pascal, C#, C++, C, CGI, Perl, SQL, APIs, SDKs, assembly, firmware, microcode, and/or other languages and tools. The components embodied as software include computer readable/executable instructions that cause one or more computers, processors and/or other electronic device to behave in a prescribed manner. Any software, whether an entire system or a component of a system, may be embodied as an article of manufacture and maintained as part of a computer-readable medium as defined previously. Another form of the software may include signals that transmit program code of the software to a recipient over a network or other communication medium. It will be appreciated that components described herein may be implemented as separate components or may be combined together.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A system including at least one processor for controlling content on a web page, the system comprising:
    a display map, stored upon a non-transitory computer-readable medium, including stored instructions that identify selected content to be displayed at a selected position within one or more web pages, where the content includes one or more data entry fields for receiving data;
    a storage map, stored upon a non-transitory computer-readable medium, including stored instructions that identify storage location information for storing the data received through the one or more data entry fields;
    a web page control logic stored upon a non-transitory computer-readable medium and configured to generate and build one or more web pages at least in accordance with the instructions from the display map that identify content and a selected position within the web page at which to display the content, where the generated web page is re-configured by modifying the instructions in the display map without modifying the web page control logic;
    where after receiving input data in the one or more data entry fields in the generated web page, the storage location information associated with the one or more data entry fields are retrieved from the storage map and the input data is caused to be stored to a storage location in accordance with the storage location information,
    wherein the web page control logic includes query generator logic configured to dynamically generate one or more database queries to retrieve previously stored data based on the location information of the storage map, and
    a generalized software routine, stored upon a non-transitory computer-readable medium, and executed on the at least one processor, configured to retrieve the identified selected content and retrieve position identification information of the identified selected content from at least one content database, where the retrieved content is displayed by the web page control logic in accordance with the position identification information.

2. The system as set forth in claim 1 where the display map is embodied as a data table that is modifiable in order to change the displayed content to the one or more web pages without re-configuring the web page control logic.

3. The system as set forth in claim 1 further including a content database, and where the web page control logic is configured to retrieve the selected content from the content database based on the display map.

4. The system of claim 1, where the web page control logic is configured generate one or more database queries for accessing one or more content bases to retrieve the selected content identified in the display map from the one or more content databases.

5. A system for controlling content on a web page, the system comprising:
    at least one processor to control retrieval of instructions from a display map, stored upon a non-transitory computer-readable medium, where the instructions identify selected content to be displayed to a selected position within one or more web pages, where the content includes data entry fields for receiving data; and
    a storage map, stored upon a non-transitory computer-readable medium, including stored instructions that identify storage location information for storing the data received through the one or more data entry fields;
    a web page control logic stored upon a non-transitory computer-readable medium and configured to generate one or more web pages at least in accordance with the instructions from the display map that identify content and a position within the generated web page at which to display the content and the data entry fields, where the generated web page is re-configured by modifying the instructions in the display map mapping without modifying the web page control logic;

the web page control logic including query generator logic configured to dynamically generate one or more queries for accessing a database to retrieve previously stored data based on location information from the storage map, where the retrieved data is displayed within associated fields of the data entry fields;

where after receiving additional input data in the data entry fields in the generated web page, the location information associated with the data entry fields are retrieved from the storage map and the additional input data is caused to be stored to a storage location in accordance with the location information; and a generalized software routine, stored upon a non-transitory computer-readable medium and executable by the at least one processor, configured to retrieve the identified selected content and retrieve position identification information of the identified selected content from at least one content database, where the retrieved content is displayed by the web page control logic in accordance with the position identification information.

6. A non-transitory computer-readable medium including stored instructions that when executed by a computer cause the computer to perform a method, the method comprising:

storing instructions in a display map that identify selected content to be displayed at a selected position within one or more web pages, where the content includes one or more data entry fields for receiving data;

storing information in a storage map that identify storage location information for storing the data received through the one or more data entry fields;

generating and building one or more web pages at least in accordance with the instructions from the display map that identify content and a selected position within the web page at which to display the content, where the generated web page is re-configured by modifying the instructions in the display map without modifying the web page control logic;

where after receiving input data in the one or more data entry fields in the generated web page, the storage location information associated with the one or more data entry fields are retrieved from the storage map and the input data is caused to be stored to a storage location in accordance with the storage location information;

dynamically generating one or more data base queries to retrieve previously stored data based on the location information of the storage map, and retrieving the identified selected content and retrieving position identification information of the identified selected content from at least one content database, where the retrieved content is displayed on a display screen in accordance with the position identification information.

7. A method, comprising:

storing instructions in a display map that identify selected content to be displayed at a selected position within one or more web pages, where the content includes one or more data entry fields for receiving data;

storing information in a storage map that identify storage location information for storing the data received through the one or more data entry fields;

generating and building one or more web pages at least in accordance with the instructions from the display map that identify content and a selected position within the web page at which to display the content, where the generated web page is re-configured by modifying the instructions in the display map without modifying the web page control logic;

where after receiving input data in the one or more data entry fields in the generated web page, retrieving the storage location information associated with the one or more data entry fields from the storage map and causing the input data to be stored to a storage location in accordance with the storage location information;

dynamically generating one or more data base queries to retrieve previously stored data based on the location information of the storage map, and retrieving the identified selected content and retrieving position identification information of the identified selected content from at least one content database, where the retrieved content is displayed on a display screen in accordance with the position identification information.

* * * * *

UNITED STATES PATENT AND TRADEMARK OFFICE
CERTIFICATE OF CORRECTION

| | | |
|---|---|---|
| PATENT NO. | : 7,814,413 B2 | Page 1 of 1 |
| APPLICATION NO. | : 10/417835 | |
| DATED | : October 12, 2010 | |
| INVENTOR(S) | : Manikandan Venkataraman et al. | |

It is certified that error appears in the above-identified patent and that said Letters Patent is hereby corrected as shown below:

In column 10, line 50, in claim 4, after "configured" insert -- to --.

In column 10, line 51, in claim 4, delete "bases" and insert -- databases --, therefor.

In column 12, line 5, in claim 6, delete "data base" and insert -- database --, therefor.

In column 12, line 36, in claim 7, delete "data base" and insert -- database --, therefor.

Signed and Sealed this
Thirty-first Day of May, 2011

David J. Kappos
*Director of the United States Patent and Trademark Office*